US007036647B2

(12) United States Patent
Malmberg (10) Patent No.: US 7,036,647 B2
(45) Date of Patent: May 2, 2006

(54) BULK LOAD DEVICE HAVING VERTICAL FUNNEL ASSEMBLY

(75) Inventor: Mats Malmberg, Rydsgard (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/974,948

(22) Filed: Oct. 28, 2004

(65) Prior Publication Data
US 2005/0133342 A1    Jun. 23, 2005

(30) Foreign Application Priority Data
Oct. 30, 2003   (SE) .................................... 0302856

(51) Int. Cl.
*B65G 11/10* (2006.01)
(52) U.S. Cl. ..................... 193/25 C; 193/30
(58) Field of Classification Search ............. 193/25 C, 193/30, 2 R; 414/143.1, 141.8
See application file for complete search history.

(56) References Cited

U.S. PATENT DOCUMENTS

| | | | |
|---|---|---|---|
| 545,201 A * | 8/1895 | Howard ....................... 193/30 |
| 3,428,156 A * | 2/1969 | Charyn et al. ................ 193/22 |
| 3,807,540 A | 4/1974 | Boulet |
| 4,727,913 A * | 3/1988 | Bliss ........................ 193/25 C |
| 5,190,132 A | 3/1993 | Stanelle et al. |
| 5,289,909 A * | 3/1994 | Maxwell et al. ............... 193/6 |
| 5,372,229 A * | 12/1994 | Leibling .................... 193/25 C |
| 5,800,112 A * | 9/1998 | Stafford ....................... 193/30 |

FOREIGN PATENT DOCUMENTS

| | | |
|---|---|---|
| DE | 878 327 | 6/1953 |
| DE | 0 329 001 | 2/1989 |
| JP | 60-31416 | * 2/1985  .................. 198/30 |

* cited by examiner

*Primary Examiner*—James R. Bidwell
(74) *Attorney, Agent, or Firm*—Drinker Biddle & Reath LLP (57) ABSTRACT

A conveying apparatus includes a conveying assembly and a vertical funnel assembly mounted at a discharge end of the conveying assembly for guiding the discharge of bulk material. The funnel assembly includes a vertical row of frames slidably disposed on a pair of vertical wires. Adjacent frames are connected by flexible connecting elements. Each frame releasably carries a funnel element for conducting the bulk material so that a funnel element can be replaced without having to dismantle all of the funnel elements. Each funnel element includes a safety release connection enabling the funnel assembly to collapse under excessive loads, thereby protecting the conveyor from damage.

44 Claims, 8 Drawing Sheets

BULK LOAD DEVICE HAVING VERTICAL FUNNEL ASSEMBLY

This application is based on and claims priority under 37 U.S.C. § 119 with respect to Swedish Application No. 0302856-0 filed on Oct. 30, 2003, the entire content of which is incorporated herein by reference.

FIELD OF THE INVENTION

The present invention relates generally to a device for minimizing dust emissions from a conveyor for bulk materials. More specifically, the invention relates to a funnel assembly for vertical downward transportation of bulk material, the funnel assembly comprising a row of funnel elements. It also relates to a funnel element and an adapter for use in the funnel assembly.

When handling bulk materials, it is very common to transport the bulk material short distances on a belt conveyor, and thereafter let the material drop from the belt conveyor to form a pile of material or a stock pile under the conveyor belt exit. Belt conveyors for bulk materials are often used for transporting seeds, crushed rocks, sand, gravel, etc. In many cases it might, however, be problematic to just let the bulk load drop from the conveyor; in case of a light bulk load (e.g. seed or grain), the wind might catch the bulk load and divert it from landing on the intended pile. This problem is also present for heavier bulks. In the case of crushed rocks, e.g. for road building purposes, there is often a problem with dust mixed with the crushed rocks. If the rock/dust mixture is to fall from an elevated conveyor to form a pile, there will not only be a problem with dust spreading in the area, there will also be a stratification of the pile; heavier (larger) stones will be more likely to end up in the centre of the pile, whereas lighter (smaller) stones and dust are more likely to end up in the periphery of the pile.

Even if the wind is not present, e.g. if the conveyor belt outlet is placed indoors, stratification is a problem. This is due to the horizontal velocity of the bulk load as it leaves the conveyor belt outlet. Heavier bulk loads, or more correctly, bulk loads with a higher weight/drag ratio, will travel a longer horizontal distance from the conveyor belt outlet than bulk loads with a lower weight/drag ratio.

There are prior art devices for reducing the above-mentioned problems. For example, there is a prior art device utilizing a vertical row of "funnels", in which row crushed rocks are falling from a conveyor to form a pile of crushed rocks. The funnels are interconnected by means of a wire extending the entire length of the funnel assembly and by separate connecting means between adjacent funnel elements. Practical tests have shown that the expected life for such a row of funnels is about 4–6 months, if the funnels are made from polyurethane. In the prior art device, it is necessary to dismount the entire funnel row, including the wire and the separate connecting means, for replacing one funnel only.

Another problem with prior art solutions is that they are not provided with safety solutions for the prevention of overloading the conveyor/funnel assembly. Overloading of the conveyor/funnel assembly typically occurs when the funnel elements are filled with the transported material due to a malfunctional level sensor or in case of a manually operated funnel assembly neglected by the operator. The load of the filled funnel elements will be transferred to the conveyor assembly. The conveyor assembly is normally not constructed to handle this vertical load and in the worst case it may cause structural damages to the conveyor assembly. This may also occur if the operator tries to elevate the funnel assembly, when it is stuck in the stock pile.

SUMMARY OF THE INVENTION

The above-mentioned and other problems are solved by means of an assembly of frames each releasably holding one funnel element, wherein the frames are interconnected by means of vertical wires and by connecting means connecting adjacent frames. The funnel elements can be removed for replacement without having to disassemble the entire funnel assembly. Other aspects of problems are solved by a funnel element being provided with at least one break-away safety means, and an adapter enabling the funnel assembly to receive funnel elements of different size.

BRIEF DESCRIPTION OF THE DRAWINGS

In the following, the invention will be described by means of exemplary embodiments, with reference to the appended drawings, wherein.

DESCRIPTION OF A PREFERRED EMBODIMENT

Figure 1:
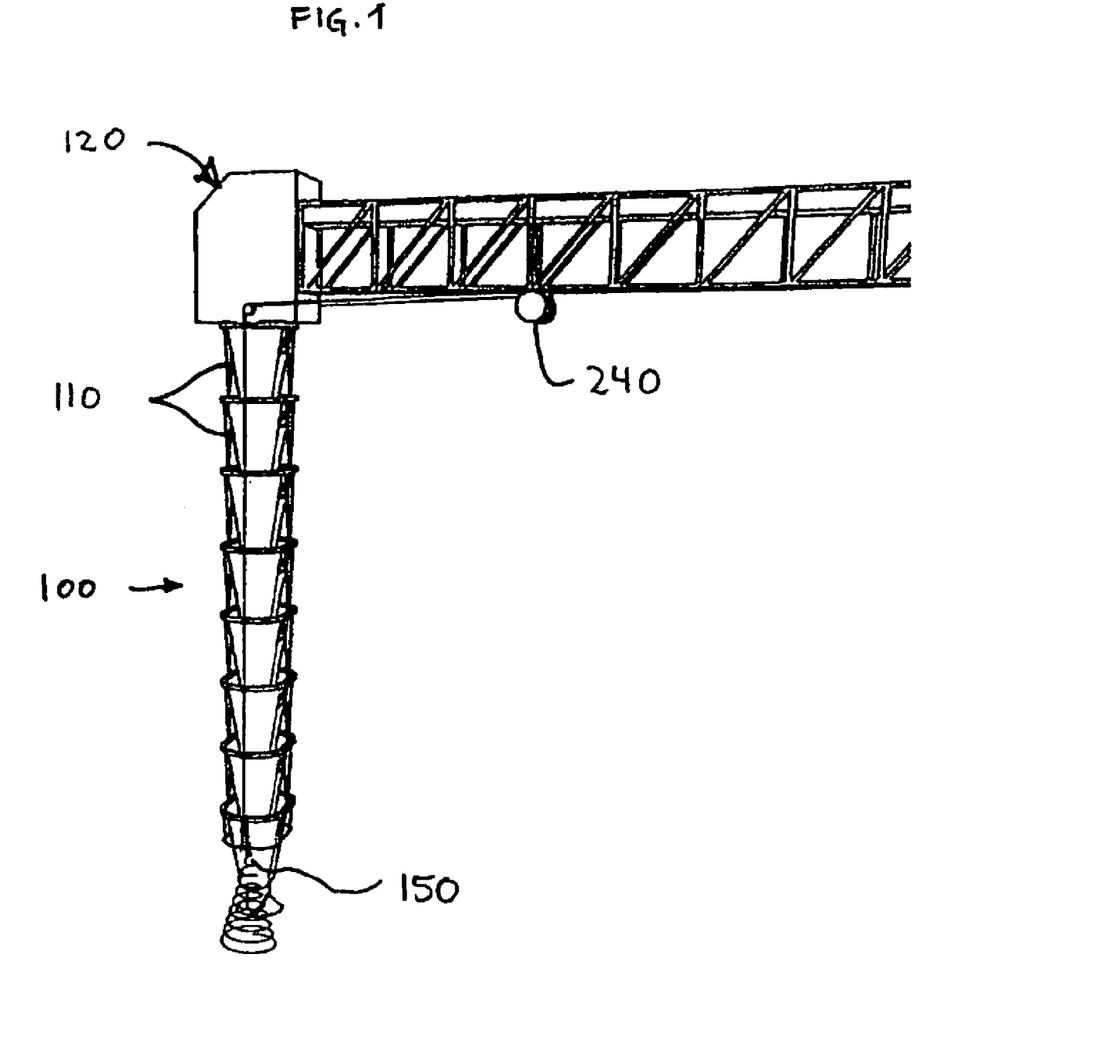
FIG. 1 is a perspective view showing a funnel assembly according to the present invention.
Figure 2:
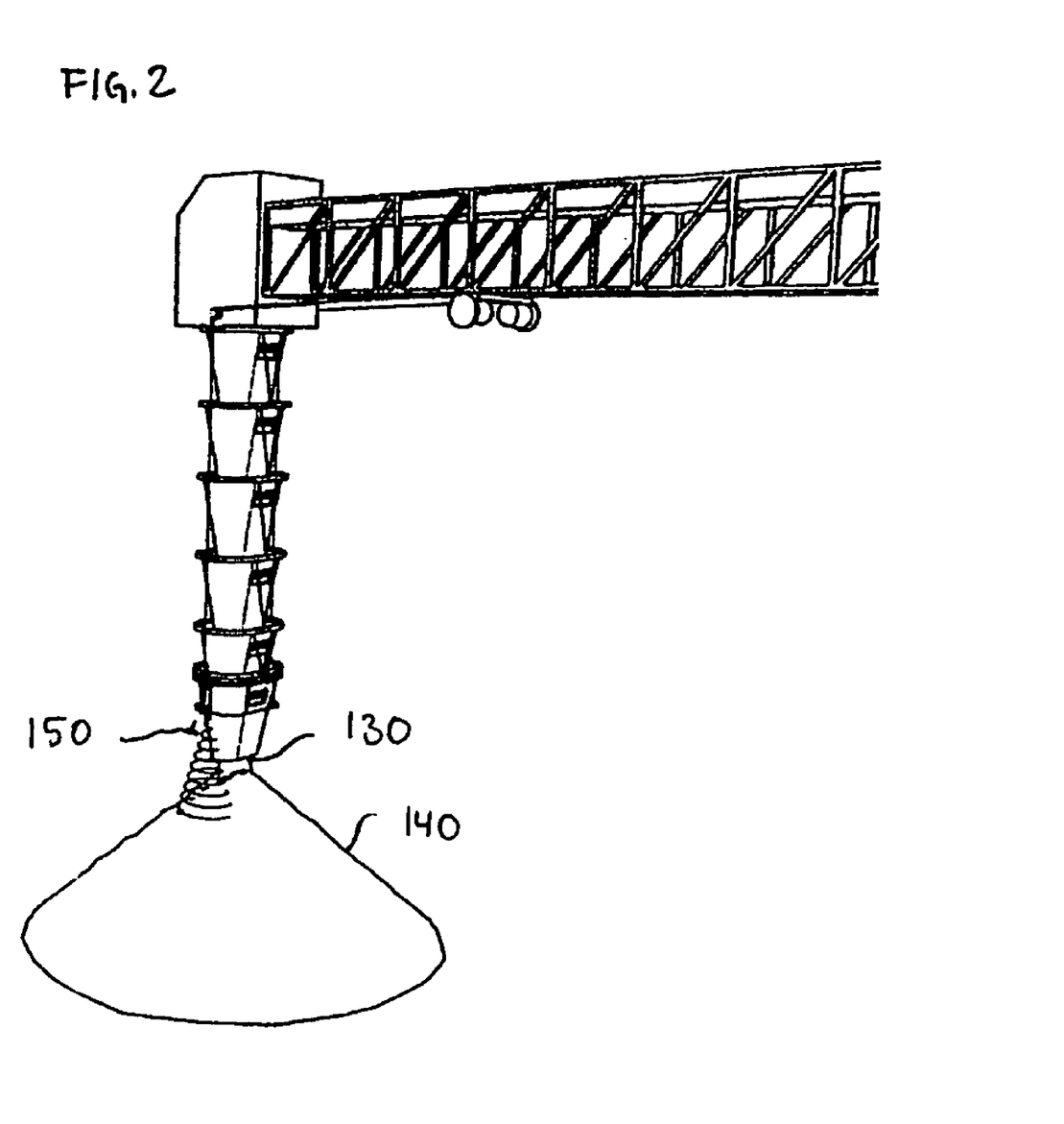
FIG. 2 is a view identical to the view of FIG. 1, and also shows a pile of bulk material gathering under the funnel assembly.

With reference to the drawings, and particularly to FIGS. 1 and 2, a funnel assembly 100 according to the present invention comprises a number of funnel elements 110, which can be stacked in one another. The funnel assembly is suspended from a conveyor assembly 120, from which bulk material 130 falls through the funnel assembly to form a pile 140 of bulk material 130. Further, a height metering device 150 and a wire drum 240 are shown.

Figure 3:
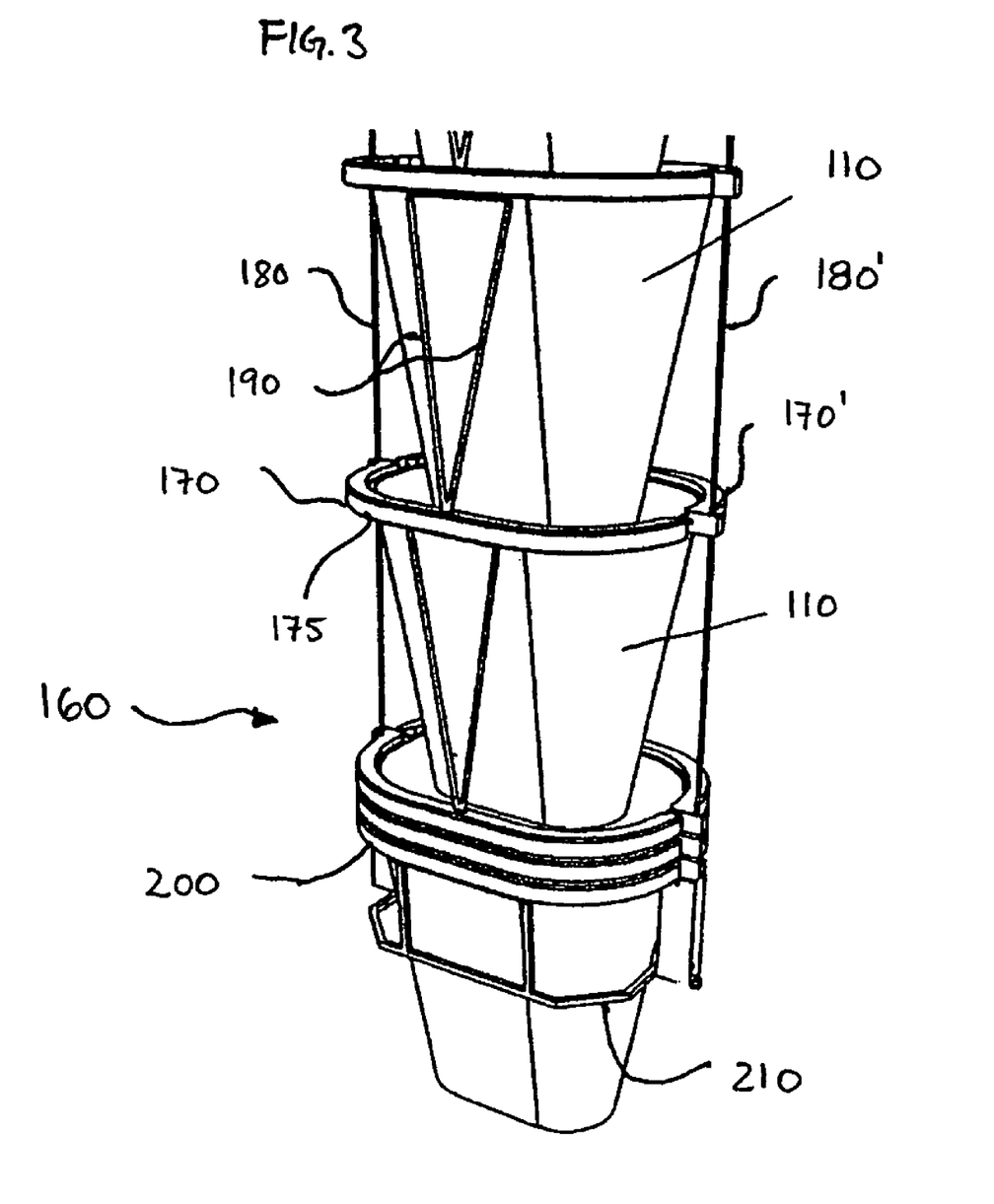
FIG. 3 is an enlarged perspective view of some lower funnel elements of the funnel assembly shown in FIG. 1 in a slightly retracted position.
Figure 4:
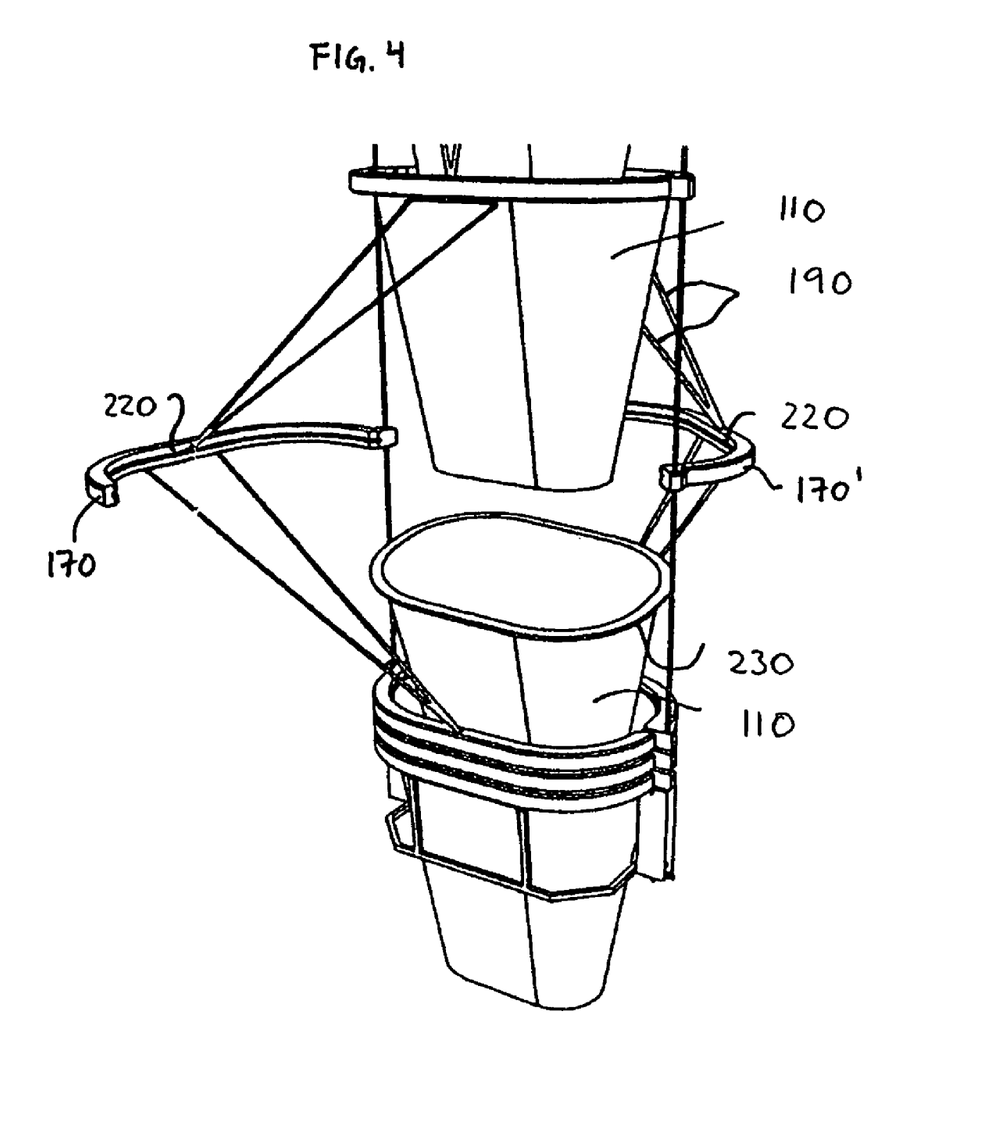
FIG. 4 is a view identical to FIG. 3, and shows a frame portion of the funnel assembly according to the present invention in an open position.

FIGS. 3 and 4 show a frame assembly 160 for suspending the funnel elements 110. The frame assembly comprises a multitude of frame portions 170, 170' being interconnected by two wires 180, 180' and by connecting means 190. Two frame portions 170, 170' together form a frame 175. A lowermost frame 200 comprises a rigid metal frame 210 for improving the stiffness of the lowest frame 200 and for fastening of the wires 180, 180'.

The frame portions 170, 170' are slidable in relation to the corresponding wire 180, 180', respectively, by being provided with through holes for the wires. This enables all frame portions 170, 170' to slide along the wires 180, 180'. The connecting means 190 interconnect adjacent frame portions 170, 170'. The topmost frame portions 170, 170' are connected to the conveyor assembly 120. This means that the frame portions 170, 170' will end up on predefined longitudinal positions in relation to each other when the frame assembly 160 is suspended from the conveyor assembly 120.

As can be seen in FIGS. 3 and 4, two frame portions 170, 170' co-operate, e.g. by a snap-fit connection or a bolt/nut assembly, to form a full frame 175 for suspending one funnel element 110. The funnel element 110 can be hosted in a groove 220, i.e., the groove 220 is adapted to host a shoulder 230 of the upper portion of the funnel element 110. This groove is however unnecessary in many cases; it might be sufficient to let the lower side of the shoulder rest on the upper surface of the frame. By using two separate frame portions, a release of funnel elements for replacement, e.g. when these have been worn, becomes easier, since the frame portions 170, 170' can be separated from one another to release the funnel as is shown in FIG. 4.

For controlling the height of the lowest funnel element 110 of the funnel row or assembly 100, the wires 180, 180' are wound upon a drum 240 (FIG. 1). By rotating the drum 240, more or less wire will be wound upon the drum, which will lead to the lowermost frame, and hence the lowest funnel element, ending up on a higher or lower position. In case much wire is wound onto the drum, the lowest funnel element will attain a high position. This is shown in FIG. 2. As can be seen, several funnel elements 110 are then hosted (i.e., telescoped) in the lowest funnel element and the lower frames 175 will be stacked upon each other. In the highest position, all funnel elements will be stacked in one another.

For automatic control of the height of the lowest funnel element, information from the level sensor 150 can be used. The level sensor senses the distance from the metal frame 210 to the top of the pile 140. By connecting this level sensor to some kind of controller connected to drive means on the drum 240, the height of the lowest funnel element can be kept on an appropriate height from the top of the pile 140. In FIGS. 1 and 2, it is implied that the level sensor 150 is some kind of transceiver, i.e. an apparatus both transmitting and receiving signals. Those signals could be e.g. ultrasound or infrared or laser light. The level sensor could however also be mechanic; a rod or the like could extend from the device and sense the top of the pile.

As can be seen in FIGS. 3 and 4, the connecting means 190 are in form of double wires or bands, which are connected to adjacent frame portions 170, 170'. Preferably, the connecting means are arranged as shown, with a single fastening point on an upper frame surface of one frame, and two fastening points on the lower frame surface of the next higher frame. This arrangement will ensure proper folding of the connecting means as the connecting means goes slack when a lower positioned frame is approaching its neighboring frame on top.

A preferred material for the funnels and frames is polyurethane. Polyurethane is known for its extraordinary wear resistance, and can be chosen with a stiffness sufficient to be form stabile enough to avoid form deviations. For certain portions of the frames, e.g. the portions where the connecting means are fastened, it might be necessary to increase the stiffness of the frame, e.g. by adding a metal piece covered by polyurethane. It might as well be beneficial if some parts of the funnel element is made from a ceramic material, e.g. the "tip" of the funnel element, i.e. the lowermost portion of the funnel element. It might as well be beneficial if some parts of the shoulder of the funnel elements are made from weaker material, have reduced material size or where material is removed as will be discussed later.

Further, both the funnel element and the frame can be made from rubber.

One important feature with the funnel assembly according to the present invention is that air will be drawn into the funnel assembly by means of the venturi effect created by the down-falling bulk load. This means that no dust will escape the funnel assembly.

Throughout this description, the term funnel element has been used for the elements inserted in the frames 175. In reality, the shape of the elements is however more like frusto-conical, with two parallel sides, as shown particularly in FIGS. 3 and 4. In practice, the shape of the conveyor belt outlet decides the shape of the funnel elements; if the conveyor belt is wide, the parallel sides are preferably about as wide as the conveyor belt. The most important feature of the funnel elements is however that they could be stacked in one another.

In the described preferred embodiment and as earlier discussed, each frame 175 consists of two frame portions 170, 170'. The invention is however not limited to such a frame design; in other embodiments, the frame 175 could be in one piece, and the funnel elements could be released from the frames by tilting the frames 175.

Figure 5:
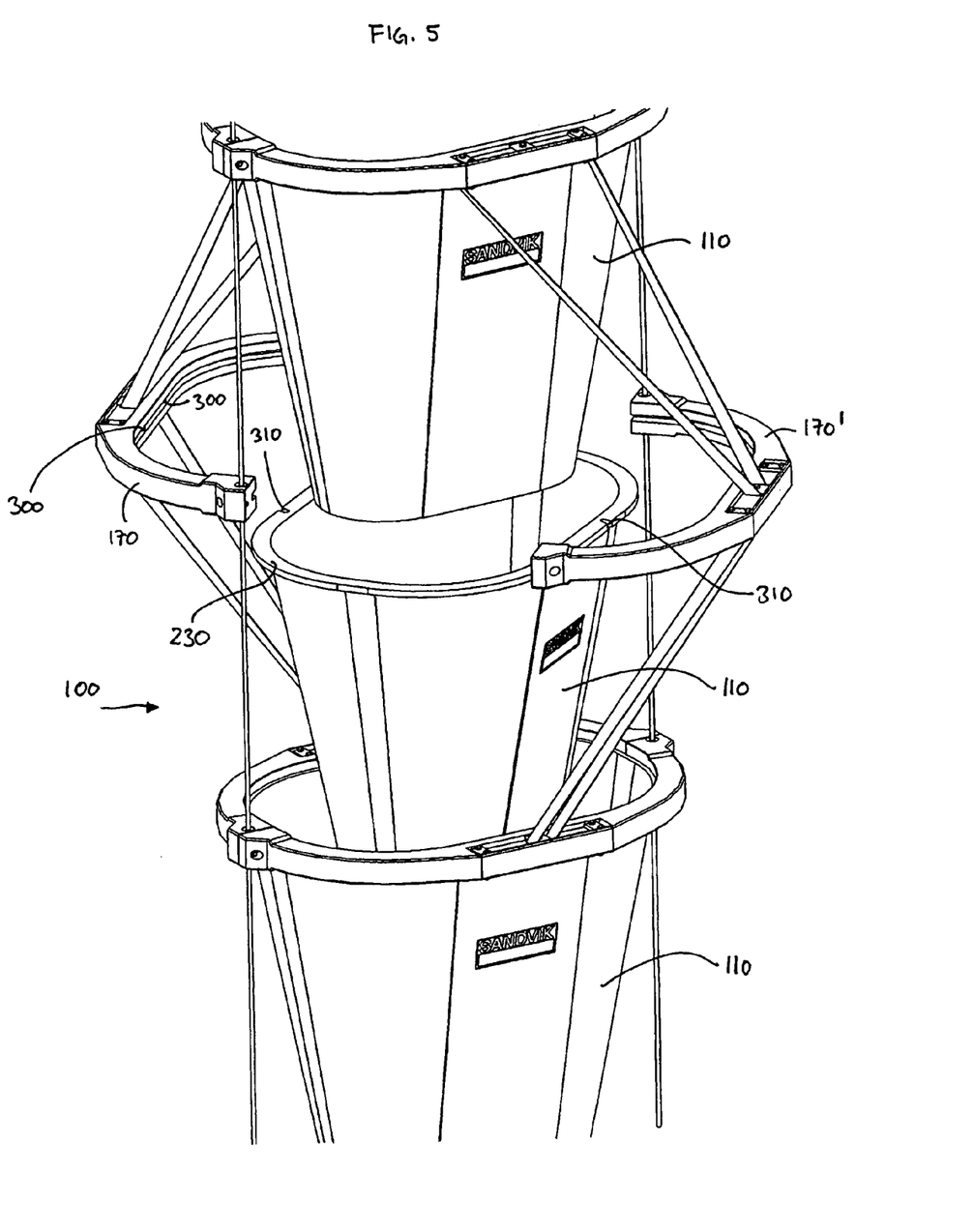
FIG. 5 is an enlarged perspective view of a couple of funnel elements of the funnel assembly with a frame portion of the funnel assembly and a funnel element provided with safety means according to the present invention.

According to another embodiment shown in FIG. 5 the funnel assembly 100 and funnel elements 110 are provided with safety means to prevent overloading of the conveyor assembly 120. The safety means enable the funnel elements 110 to collapse if they are loaded above a certain load. One form of safety means on the funnel element 110 comprises material weakenings in the form of recesses 310 arranged in the shoulder 230 of the funnel element (see FIG. 8a). The recesses create a weakened zone that is susceptible to being fractured under excessive loads.

Figure 8A:
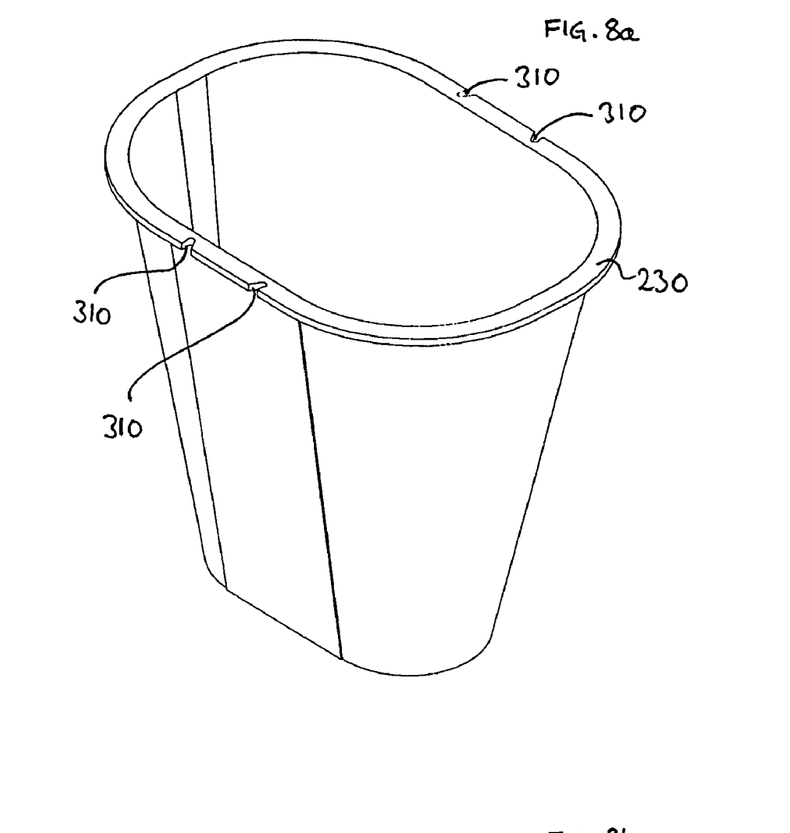
FIG. 8*a* shows a funnel element provided with safety means according to the present invention.

The weakened zone could comprise reduced material size along selected portions of the shoulder 230. Alternatively, the weakened zone could be made of a weaker material than the rest of the shoulder. When the weakened zone is created by the removal of portions of the shoulder 230 to create recesses 310 at selected positions, at least two such recesses 310 can be arranged in each of two opposite sides of the shoulder 230 of the funnel element 110.

Figure 8B:
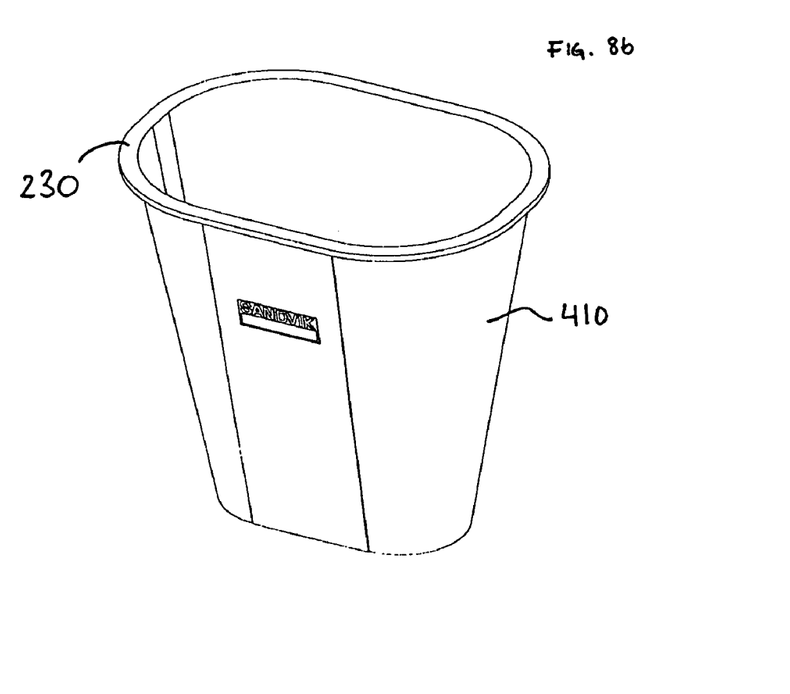
FIG. 8*b* shows a funnel element to be used with the adapter according to the present invention.

In FIG. 8a the funnel element 110 is shown having two recess-type weakenings 310 in each of the long sides of the shoulder 230. The shape of the recesses 310 can be triangular, square, elliptic, circular, hexagonal, pentagonal or have any other suitable shape. In FIG. 8b an optional design of the funnel element 410 without any weakened region is shown.

Figure 7A:
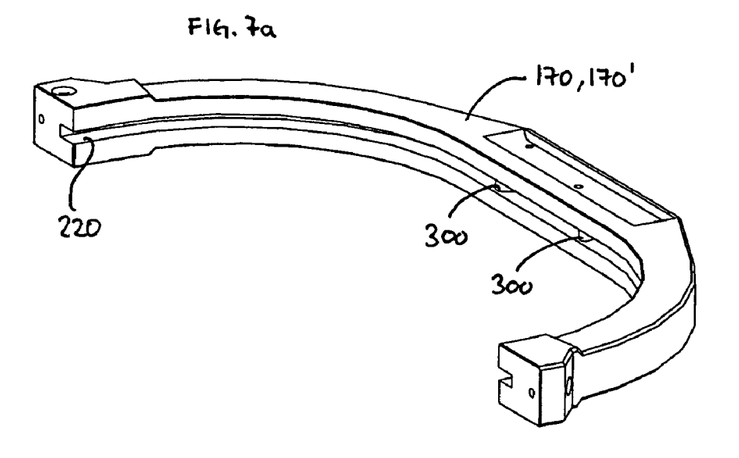
FIG. 7*a* shows a frame portion provided with safety means according to the present invention.

In FIG. 7a is shown that the frame portions 170, 170' can be provided with projections or reinforcements 300 arranged in the grooves 220 thereof to be received in the respective recesses 310 of the funnel element. This ensures that the frame cannot receive a funnel element that does not possess the safety recesses 310. The projections also reinforce the funnel elements, thereby increasing the stability of the funnel assembly 100.

Figure 6:
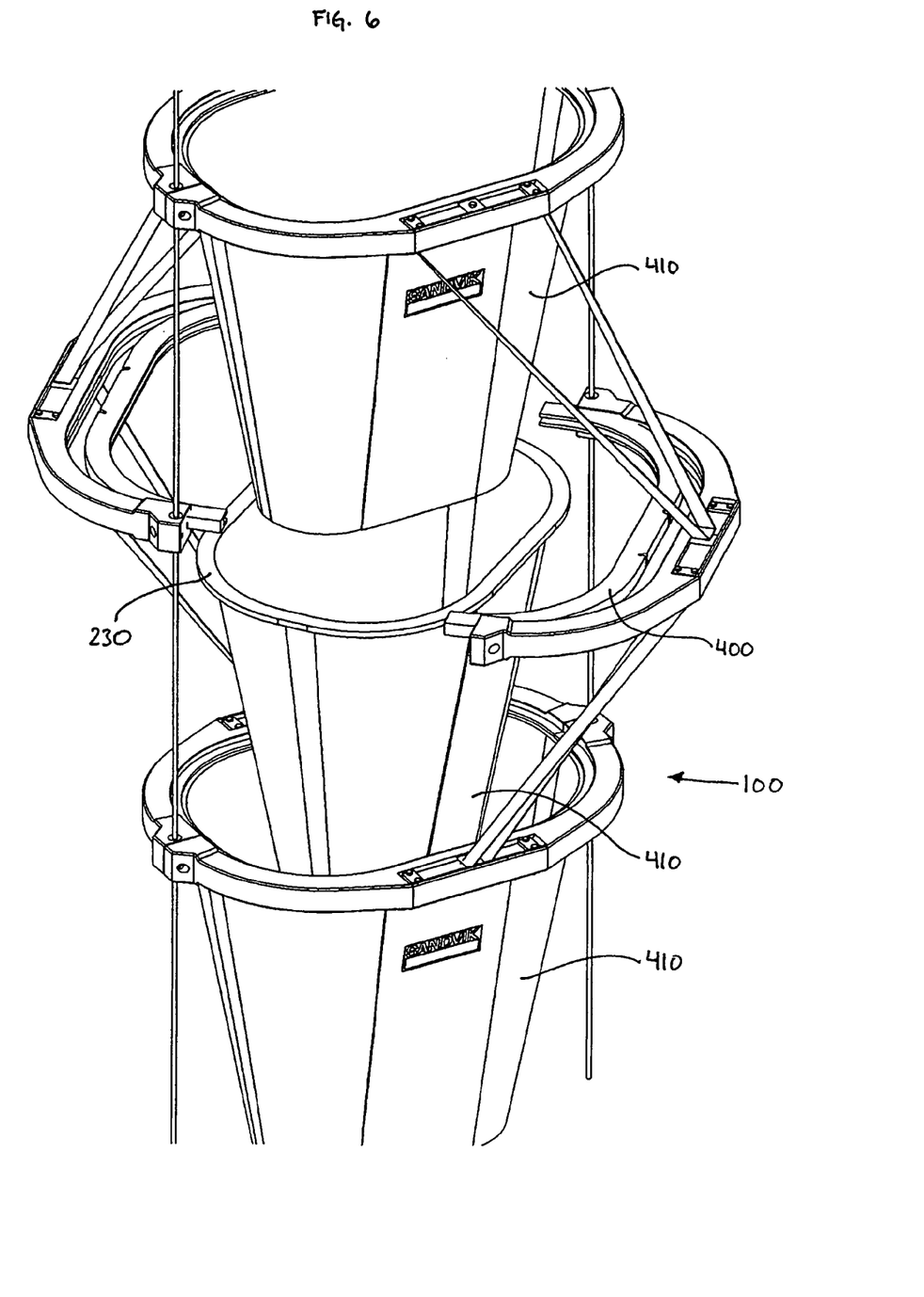
FIG. 6 shows the funnel assembly of FIG. 5, where the frame portions are provided with an adapter according to the present invention.
Figure 7B:
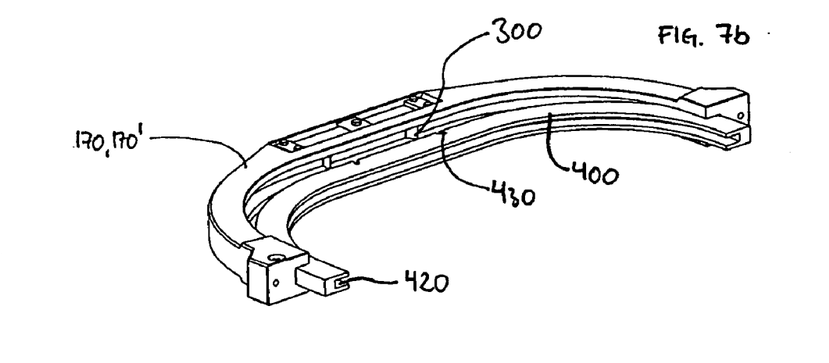
FIG. 7*b* shows a frame portion provided with safety means and an adapter according to the present invention.
Figure 7C:
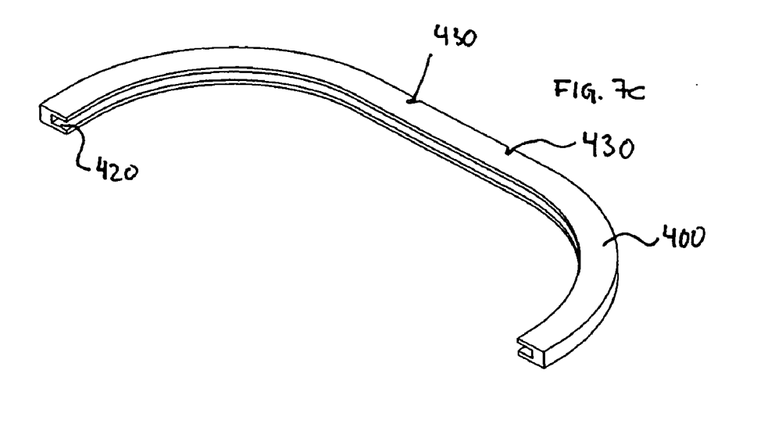
FIG. 7*c* shows an adapter for a frame portion provided with safety means according to the present invention.

In FIG. 6 the funnel assembly 100 is also provided with an adapter 400 that enables the funnel assembly 100 to receive funnel elements 110, 410 of different size or funnel elements without safety means. The adapter 400 is received in the grooves 220 of the frame portions 170, 170', shown in FIG. 7b. The external shape of the adapter 400 corresponds to the internal shape of the groove 220. The adapter 400 is provided with a groove 420 to receive the shoulder 230 of the funnel elements 110, 410. The adapter 400 can be provided with recesses 430, corresponding to the projections 300 arranged on the frames 170, 170' as shown in FIGS. 7b and 7c. It can also be arranged to have projections (not shown) in the groove 420 corresponding to the recesses 310 arranged on the funnel elements 110. Thereby, the adapter 400 adapts not only to funnel elements 110, provided with safety means 310, but also to funnel elements 410 without safety means.

The function of the safety means is as follows. If the height-level sensor 150 for some reason is out of order the top of the pile 140 of bulk material 130 inevitably will reach the lower part of the lowermost funnel element. The funnel element will be filled with bulk material as the outlet of the funnel element is covered by the top of the pile 140. If the funnel elements were not provided with safety means, the above funnel elements will also be filled with bulk material from the conveyor assembly. The weakened region(s) of the funnel elements, however, will break and accomplish a collapse of the funnel elements under the weight of the load if they are loaded above a certain load. If the bulk material continues to be transported to the collapsed funnel assembly, the material will overflow the edges of the lowermost funnel element or merely flow by the collapsed lowermost funnel element since the funnel element has collapsed. Overload of the conveyor assembly is avoided.

The invention should not be limited to the shown embodiment; several modifications within the scope of the appended claims are possible.

What is claimed is:

1. A funnel assembly for vertical downward transportation of bulk material, comprising a vertical row of frames slidably disposed on a plurality of vertical wires, adjacent frames being interconnected by connecting elements, each frame releasably carrying a funnel element for conducting the bulk material, wherein each frame includes a groove, and each funnel element includes an outwardly projecting upper shoulder received in the groove of a respective frame.

2. The funnel assembly according to claim 1 wherein the funnel element comprises polyurethane.

3. The funnel assembly according to claim 1 wherein a portion of the funnel element comprises a ceramic material.

4. The funnel assembly according to claim 1 wherein a portion of the funnel element comprises rubber.

5. The funnel assembly according to claim 1 wherein the funnel elements are stackable within one another.

6. The funnel assembly according to claim 1 further including a sensor adjacent a lowermost funnel element for sensing a top of a pile of bulk material being deposited by the funnel assembly.

7. The funnel assembly according to claim 6 wherein the sensor is mounted on a metal frame to which the lowermost funnel element is secured.

8. The funnel assembly according to claim 1 wherein each frame comprises two frame portions that can be mutually separated to release a respective funnel element.

9. The funnel assembly according to claim 1 wherein each funnel element and its respective frame include a safety connection enabling the funnel elements to collapse under the weight of excess load.

10. The funnel assembly according to claim 9 wherein the safety connection comprises a weakened break-away region in the funnel element.

11. The funnel assembly according to claim 10 wherein the weakened region is produced by a locally reduced material size in the shoulder.

12. The funnel assembly according to claim 10 wherein the weakened region is produced by at least one recess formed in the funnel element.

13. The funnel assembly according to claim 10 wherein each frame includes a groove, and each funnel element includes a shoulder mounted in the groove of a respective frame.

14. The funnel assembly according to claim 13 wherein each funnel element includes a weakened break-away region formed in the shoulder.

15. The funnel assembly according to claim 14 wherein each funnel element includes recesses formed in the shoulder to form the weakened break-away region.

16. The funnel assembly according to claim 15 wherein each groove includes at least one projection arranged to be received in a respective recess of the funnel element.

17. A funnel assembly according to claim 1 further including an adapter mounted in the frame for receiving a funnel element different than a funnel element for which the frame itself is adapted to receive.

18. The funnel assembly according to claim 17 wherein each frame includes a groove extending around an inner periphery thereof, the adapter including an outwardly projecting shoulder received in the groove.

19. A funnel element adapted for use in a material-conducting vertical funnel assembly, the funnel element including a safety release zone to facilitate release of the funnel element under heavy loads, wherein the safety zone comprises a weakened break-away zone.

20. The funnel element according to claim 19 wherein the funnel element includes an outwardly projecting shoulder at its upper end, the break-away zone being formed in the shoulder.

21. The funnel element according to claim 20 wherein the break-away zone is formed by at least two recesses formed in the shoulder.

22. The funnel element according to claim 21 wherein there are two recesses formed in each of two opposite sides of the shoulder.

23. A conveying apparatus comprising a conveyor assembly and a vertical funnel assembly mounted at a discharge end of the conveyor assembly, wherein the funnel assembly comprises a vertical row of frames slidably disposed on a plurality of vertical wires, adjacent frames being interconnected by connecting elements, each frame releasably carrying a funnel element for conducting the bulk material, wherein each connecting element includes discrete fastening points including a single fastening point on an upper frame surface and two fastening points on a lower frame surface.

24. The conveying apparatus according to claim 23 further including a drivable drum mounted on the conveyor assembly, the wires being wound on the drum.

25. A funnel assembly for vertical downward transportation of bulk material, comprising a vertical row of frames slidably disposed on a plurality of vertical wires, adjacent frames being interconnected by connecting elements, each frame releasably carrying a funnel element for conducting the bulk material, wherein each frame comprises two frame portions that can be mutually separated to release a respective funnel element.

26. The funnel assembly according to claim 25 wherein each connecting element includes discrete fastening points including a single fastening point on an upper frame surface and two fastening points on a lower frame surface.

27. The funnel assembly according to claim 25 wherein the funnel element comprises polyurethane.

28. The funnel assembly according to claim 25 wherein a portion of the funnel element comprises a ceramic material.

29. The funnel assembly according to claim 25 wherein a portion of the funnel element comprises rubber.

30. The funnel assembly according to claim 25 wherein the funnel elements are stackable within one another.

31. The funnel assembly according to claim 25 further including a sensor adjacent a lowermost funnel element for sensing a top of a pile of bulk material being deposited by the funnel assembly.

32. The funnel assembly according to claim 25 wherein the sensor is mounted on a metal frame to which the lowermost funnel element is secured.

33. The funnel assembly according to claim 25 wherein each frame comprises two frame portions that can be mutually separated to release a respective funnel element.

34. The funnel assembly according to claim 25 wherein each frame includes a groove, and each funnel element includes an outwardly projecting upper shoulder received in the groove of a respective frame.

35. The funnel assembly according to claim 25 wherein each funnel element and its respective frame include a safety connection enabling the funnel elements to collapse under the weight of excess load.

36. The funnel assembly according to claim 35 wherein the safety connection comprises a weakened break-away region in the funnel element.

37. The funnel assembly according to claim 36 wherein the weakened region is produced by a locally reduced material size in the shoulder.

38. The funnel assembly according to claim 36 wherein the weakened region is produced by at least one recess formed in the funnel element.

39. The funnel assembly according to claim 36 wherein each frame includes a groove, and each funnel element includes a shoulder mounted in the groove of a respective frame.

40. The funnel assembly according to claim 39 wherein each funnel element includes a weakened break-away region formed in the shoulder.

41. The funnel assembly according to claim 40 wherein each funnel element includes recesses formed in the shoulder to form the weakened break-away region.

42. The funnel assembly according to claim 41 wherein each groove includes at least one projection arranged to be received in a respective recess of the funnel element.

43. A funnel assembly according to claim 25 further including an adapter mounted in the frame for receiving a funnel element different than a funnel element for which the frame itself is adapted to receive.

44. The funnel assembly according to claim 43 wherein each frame includes a groove extending around an inner periphery thereof, the adapter including an outwardly projecting shoulder received in the groove.

* * * * *